(12) United States Patent
O'Donnell et al.

(10) Patent No.: US 6,611,770 B1
(45) Date of Patent: Aug. 26, 2003

(54) LIQUID CONDUCTION INDICATION IN A MAGNETIC FLOWMETER

(75) Inventors: William E. O'Donnell, Minneapolis, MN (US); Thomas P. Coursolle, St. Paul, MN (US); David L. Wehrs, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/578,279

(22) Filed: May 25, 2000

Related U.S. Application Data

(63) Continuation-in-part of application No. 09/209,134, filed on Dec. 10, 1998.

(51) Int. Cl.⁷ ................................. G01F 1/58
(52) U.S. Cl. .................. 702/49; 702/45; 73/861.11; 73/861.08
(58) Field of Search .............. 702/49, 45, 46, 702/50, 55, 64, 65, 78, 100, 115, 183, 190, 194, 197, 199, FOR 103, FOR 104, FOR 106, FOR 109, FOR 127, FOR 128, FOR 134, FOR 164, FOR 170, FOR 171; 706/906, 907, 914, 915; 700/281, 282; 73/1.16, 1.22, 861.11–861.17, 861.08, 861.02, 861.03, 227; 324/439, 444

(56) References Cited

U.S. PATENT DOCUMENTS

| | | | |
|---|---|---|---|
| 5,301,556 A | 4/1994 | Nissen et al. | 73/861.15 |
| 5,370,000 A | 12/1994 | Herwig et al. | 73/861.17 |
| 5,426,984 A | 6/1995 | Rovner et al. | 73/861.17 |
| 5,578,763 A * | 11/1996 | Spencer et al. | 73/861.08 |
| 5,644,240 A * | 7/1997 | Brugger | 324/439 |
| 5,895,864 A | 4/1999 | Wang et al. | 73/861.12 |
| 6,014,902 A | 1/2000 | Lewis et al. | 73/861.12 |
| 6,237,424 B1 * | 5/2001 | Salmasi et al. | 73/861.11 |

FOREIGN PATENT DOCUMENTS

| | | |
|---|---|---|
| EP | 0915324 | 5/1999 |
| GB | 2333161 | 7/1999 |

* cited by examiner

Primary Examiner—Hal Wachsman
(74) Attorney, Agent, or Firm—Westman, Champlin & Kelly, P.A.

(57) ABSTRACT

A magnetic flowmeter with an improved liquid conduction indication has a flowtube assembly with a passage for liquid flow and has an electromagnet mounted outside the passage that provides ramped magnetic excitation. An electrode circuit couples through the passage and generates ramp spikes and a flow signal. A processor receiving the flow signal and generating a flow rate output. The processor also receives the ramp spikes and generates a filtered integral of the ramp spikes as a liquid conduction or empty pipe indication.

28 Claims, 10 Drawing Sheets

FIG. 9(A)
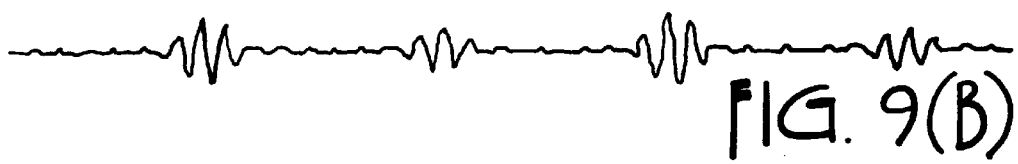
FIG. 9(B)
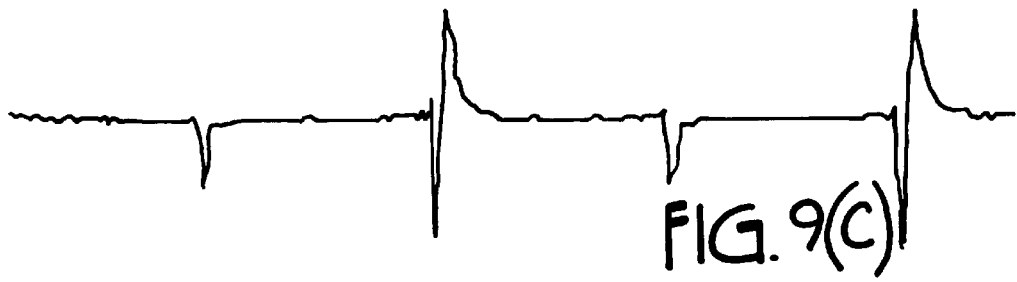
FIG. 9(C)
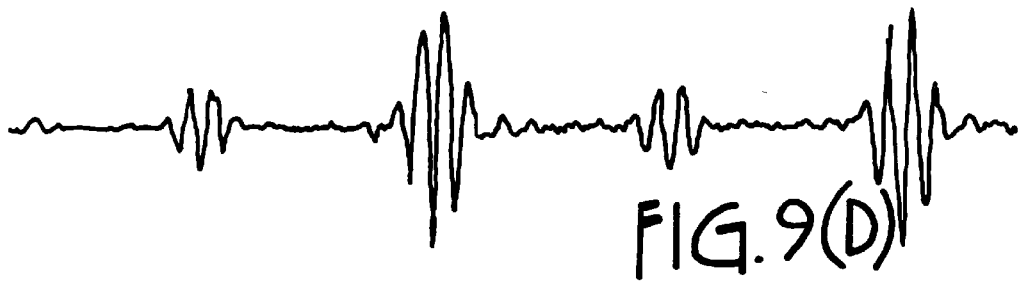
FIG. 9(D)
FIG. 9

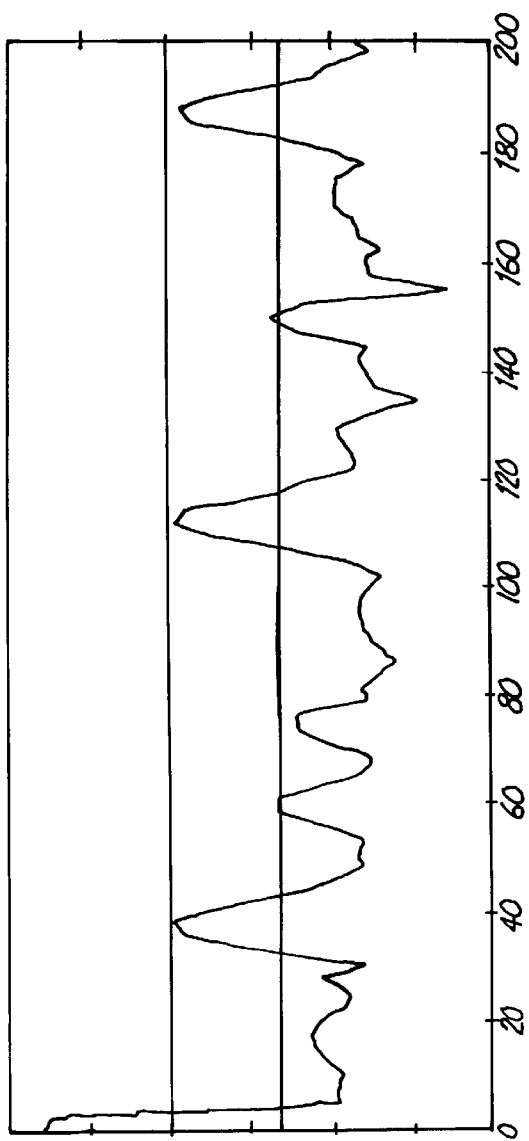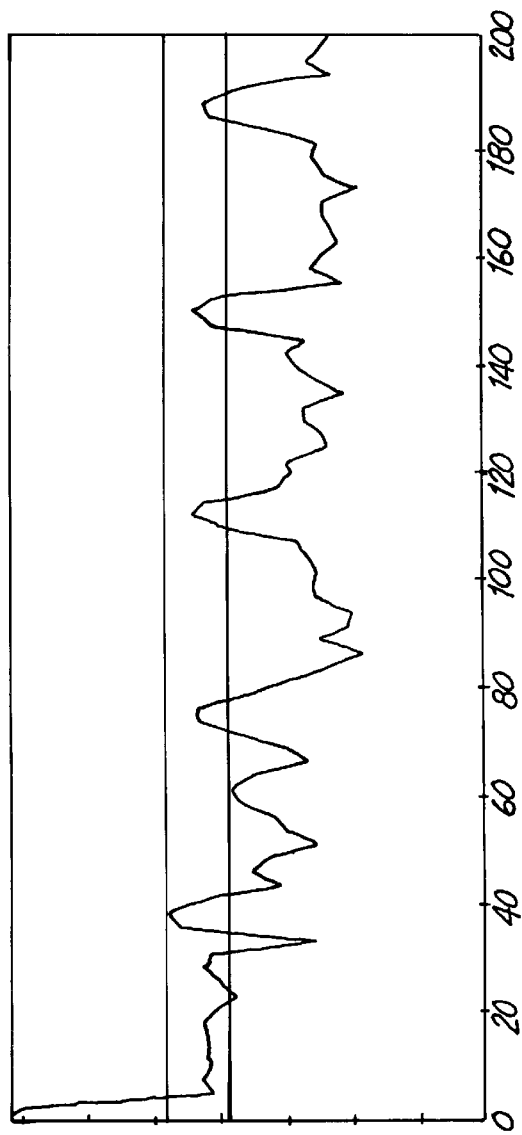
FIG. 10(A)
FIG. 10(B)
FIG. 10

LIQUID CONDUCTION INDICATION IN A MAGNETIC FLOWMETER

REFERENCE TO CO-PENDING APPLICATION

This application is a continuation-in-part of application Ser. No. 09/209,134, filed Dec. 10, 1998 and titled "ADJUSTABLE BANDWIDTH FILTER FOR PROCESS VARIABLE TRANSMITTER," pending.

BACKGROUND OF THE INVENTION

This invention relates to magnetic flowmeters used for water, chemical or wastewater process pipes. In particular, this invention relates to detecting low liquid conductivity or empty pipe conditions in these magnetic flowmeters.

The calibration or accuracy of the flow rate output of a magnetic flowmeter can be compromised if there is low conductivity in the electrode circuit of the magnetic flowmeter. Low conductivity in the electrode circuit is often an indication of problems such as a partially filled or empty pipe, low liquid conductivity, fouled or polarized electrodes, or a broken or disconnected electrode lead.

Various conductivity circuits are known that generate and inject ac, dc or pulsed signal into the electrode circuit to detect conductivity. This injection creates an undesired path for current leakage of a portion of the flow signal back through the conductivity circuit. A calibration shift or inaccuracy of the flow rate output results from this leakage.

There is a need for a conduction indication that avoids these current leakage problems.

SUMMARY OF THE INVENTION

A magnetic flowmeter is disclosed that has an improved liquid conduction indication. The conduction indication uses naturally occurring "ramp pulses" which are related to conductance of the liquid are found in an electrode circuit of the magnetic flowmeter. These ramp pulses are used as a liquid conduction indication.

The conduction indication does not require electrically connecting any drive or excitation circuit to the electrode circuit, and loading of the electrode circuit can be avoided.

BRIEF DESCRIPTION OF THE DRAWINGS

FIGS. 9A, 9B, 9C and 9D illustrate a second example of processed, full pipe, ramp spike waveforms, with unfiltered ramp spikes at (a) and (c) and filtered spikes at (b) and (d), using 200 microSiemens conductivity at (a) and (b), and using 20 microSiemens conductivity at (c) and (d);

FIGS. 10A and 10B illustrate amplitudes of spectral components of electrode circuit signals for full and empty pipe conditions.

DETAILED DESCRIPTION OF THE ILLUSTRATED EMBODIMENTS

A magnetic flowmeter is disclosed that has an improved liquid conduction indication. The conduction indication uses naturally occurring "ramp pulses" found in an electrode circuit of the magnetic flowmeter. The conduction indication does not require electrically connecting any drive or excitation circuit to the electrode circuit, and loading of the electrode circuit can be avoided.

The magnetic flowmeter includes an electromagnet mounted outside the passage. The electromagnet provides ramped magnetic excitation. The ramped magnetic excitation induces both ramp spikes and a flow signal in the electrode circuit according to Faraday's Law of electromagnetic induction. The motion of the liquid relative to the flowmeter induces the flow signal.

The time rate of change of the magnetic field induces the ramp spikes, which are a naturally occurring phenomenon that is not usually used in flow measurement. The ramp spikes have amplitudes and shapes that vary depending on the conductivity of the liquid. The ramp spikes are electronically integrated and then used to provide an indication of liquid conductivity and, in particular, a useful indication of when the flowmeter pipe is not full.

Figure 1:
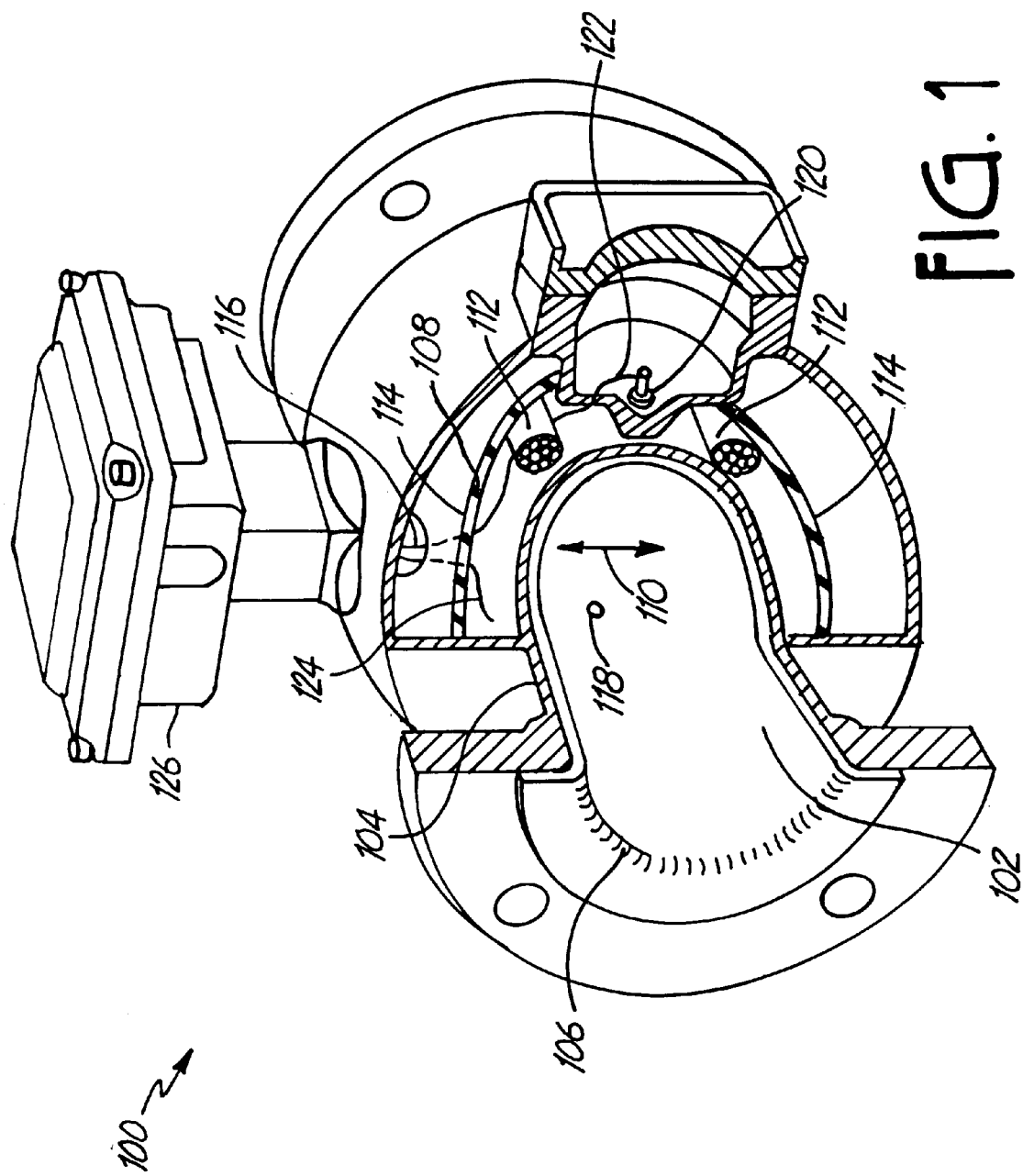
FIG. 1 illustrates a typical magnetic flowmeter arrangement.

In FIG. 1, a magnetic flowmeter 100, having an improved conduction indication, is illustrated.

Flowmeter 100 has a passage 102 for liquid flow. Passage 102 comprises a flanged pipe section 104. Pipe section 104 is typically formed of nonmagnetic stainless steel for pressure containment and is lined with an electrically insulating liner 106, typically formed from Teflon, polyurethane, Tefzel or other plastic resin. For lower pressure applications, pipe section 104 can be formed from electrically insulating plastic resin, in which case a liner 106 is not needed.

Other designs of passages 102 can be used, as well. For example, a metal pipe section 104 and only a partial insulating lining 106 in an annulus about each electrode can be used. In another alternate arrangement, the pipe section 104 is formed without flanges, and the flowmeter 100 can then be clamped between flanges of mating pipes using extended bolts to cage the flowmeter 100.

An electromagnet 108 is mounted outside the passage 102 and generates a ramped magnetic excitation 110 in the fluid inside the passage 102. As illustrated, the electromagnet 108 comprises a pair of coils 112 surrounded by a magnetic return circuit 114. The magnetic return circuit 114 can be formed of a ferromagnetic material such as alloy M-19. Magnetic return circuit 114 can also include salient poles inside the coils 112, a laminated core, hard magnetic materials and other magnetic return circuit arrangements known for use in magnetic flowmeters.

The electrical excitation of the electromagnet 108 is typically a ramped current when magnetically soft materials are used in electromagnet 108. Alternatively, when electromagnet 108 includes magnetizable and demagnetizable hard magnetic materials, the excitation current is typically magnetizing and demagnetizing current pulses.

The ramped magnetic excitation 110 in the passage 102 interacts with liquid flowing through the passage 102 to generate an electromotive force (emf) in the liquid, also called an electrode voltage or flow signal, according to Faraday's Law of Electromagnetic Induction.

The magnetic flowmeter 100 includes an electrode circuit 116 that couples through, and includes, the liquid in the passage 102. The electrode circuit includes electrodes 118, 120 that contact the liquid in the passageway and form a conductive connection to the liquid. The electrode circuit also includes leads or wires 122, 124 that carry the electrode voltage from electrodes 118, 120 to a processing circuit in compartment 126. Electrode leads 122, 124 can also extend to a processing circuit in a location that is remote from the passage 102. The electrode voltage includes a flow signal and ramp spikes as explained in more detail below in connection with FIG. 2. The processing circuitry in compartment 126 (or at a remote location) provides an improved liquid conduction indication and is explained in more detail below in connection with FIG. 3 et seq.

Figure 2:
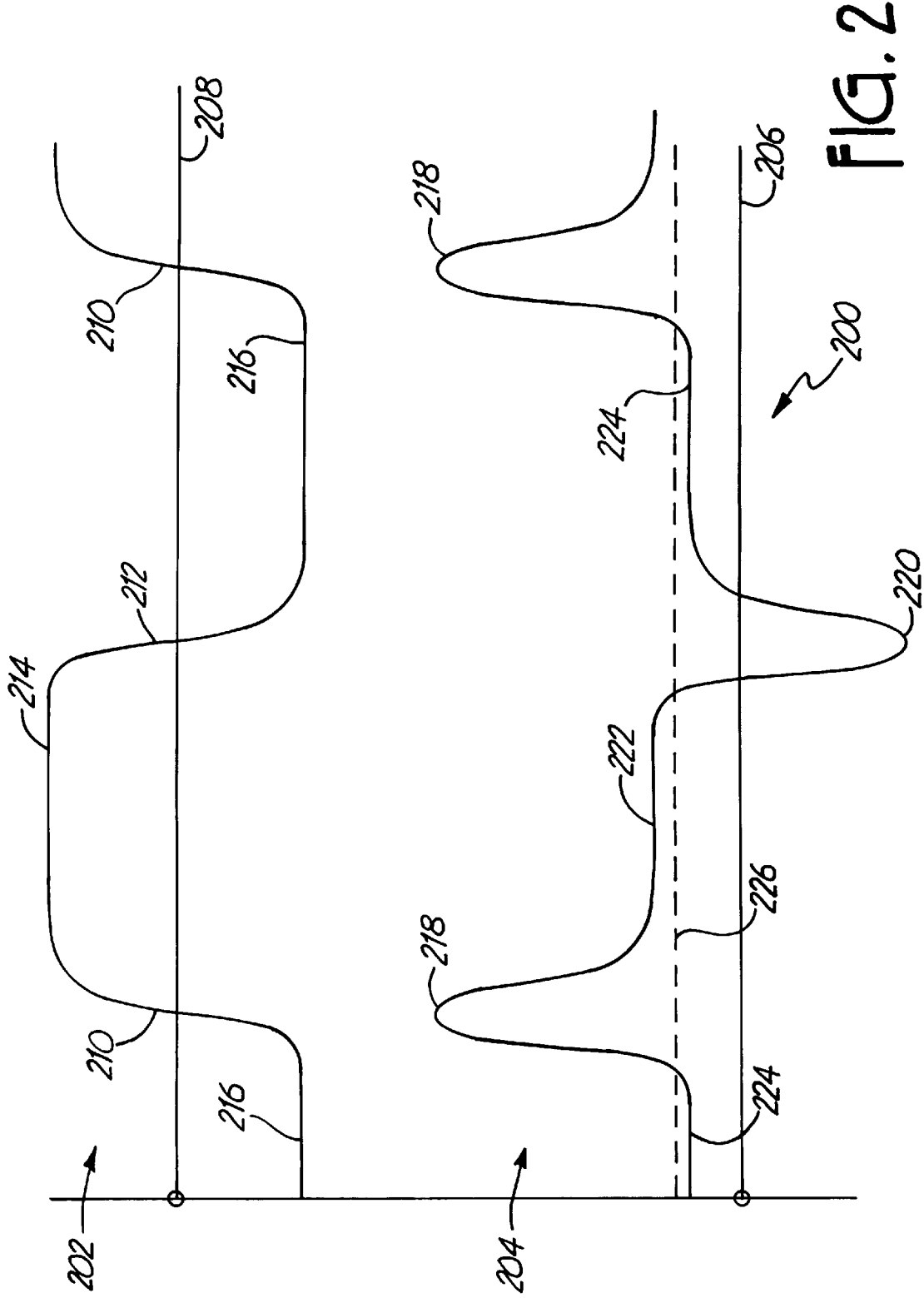
FIG. 2 is a simplified timing diagram of magnetic excitation and electrode voltage waveforms.

In FIG. 2, a simplified timing diagram 200 illustrates ramped magnetic excitation 202 and electrode circuit voltage 204 as functions of time. The scale factors have been distorted to more clearly illustrate the important timing features. The horizontal axes 206, 208 represents time. The vertical axes represent amplitudes of the ramped magnetic excitation 202 and the electrode circuit voltage 204.

The ramped magnetic excitation 202 illustrates the scalar magnitude of a vertical magnetic field B at a point in the passage midway between the electrodes. The electrode circuit voltage 204 illustrates the magnitude of differential voltage on electrode leads that connect to processing circuitry.

As shown in FIG. 2, the ramped magnetic excitation 202 is generally rectangular, but has repetitive ramp transitions 210, 212 with limited slew rates between flat levels 214, 216 as a function of time. The ramped magnetic excitation 202 alternates between a positive flat level 214 and a negative flat level 216.

During the alternating flat levels 214, 216, a corresponding flow signal is induced by Faraday's Law in the electrode voltage 204 as illustrated at 222, 224. It will be understood that the flow signal can be offset from zero as illustrated by dashed line 226. This DC offset from zero is due to different electrochemical potentials at the two electrodes and stray thermocouple voltages in the electrode circuit and does not interfere with flow measurement.

During the ramp transitions 210, 212, ramp spikes 218, 220 are generated as part of the electrode voltage 204. The ramp spikes 218, 220 comprise alternating positive ramp spikes 218 and negative ramp spikes 220.

The ramp spikes 218, 220 are generated as a result of residual transformer action between the ramped magnetic excitation and the portions of the electrode circuit that form a magnetic pickup loop in the magnetic field.

The portion of the electrode circuit that includes the conduction path in the liquid between the electrodes, the electrodes and the portion of the electrode leads inside the magnetic shield are all arranged generally in a plane that is selected to reduce transformer coupling. In some cases, the position of one or more of the leads is carefully adjusted to reduce or "null" the residual transformer coupling between the excitation magnetic field and the electrode circuit. The transformer coupling is intentionally reduced so that it does not interfere with measurement of the flow signal. In spite of these efforts, it is found that there is still usually a residual amount of transformer coupling that produces ramp spikes 218, 220.

It is found that this residual transformer coupling and the ramp spikes are sensitive to liquid conduction and can be used as an indication of liquid conduction in the passageway. By using the ramp spikes, an indication of liquid conduction is obtained without the need to load the electrode circuit with additional components. The ramp spikes can be measured without an undesired shift in calibration of the flow rate output. Exemplary circuits and methods for indicating liquid conduction in a magnetic flowmeter using ramp spikes are described below in connection with FIGS. 3, 4, 5 and 6.

Figure 3:
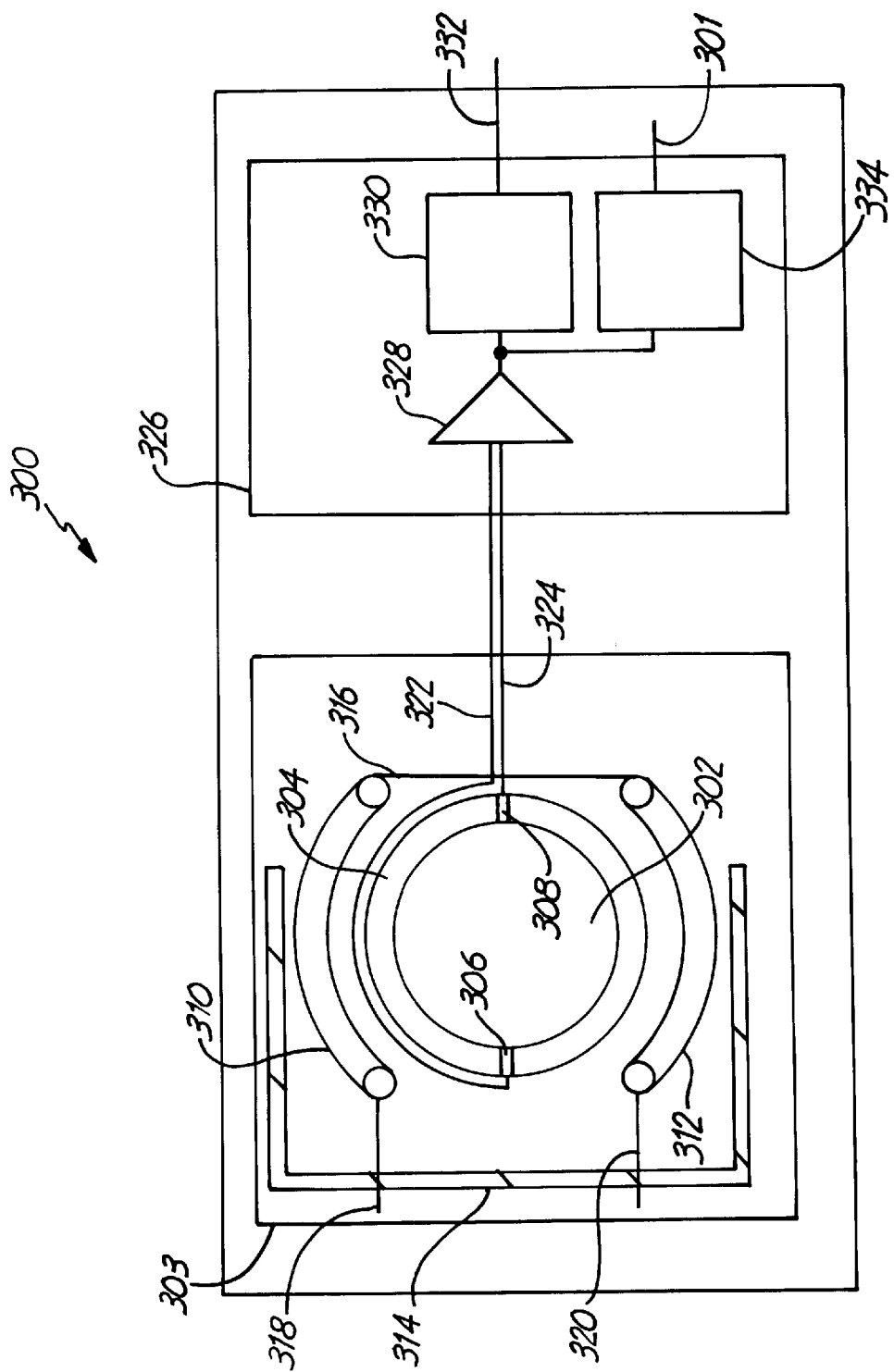
FIG. 3 illustrates an embodiment of a magnetic flowmeter with a processor providing an improved liquid conduction indication.

In FIG. 3, a magnetic flowmeter 300 with an improved liquid conduction indicating output 301 is illustrated in block diagram form. Magnetic flowmeter 300 includes a flowtube assembly 303. As explained in connection with FIG. 1, flowmeter 300 can be assembled in one of several alternate configurations, and flowtube assembly 303 can be sized as needed to fit the mating piping in a process installation, which typically has diameters ranging from 5 millimeters to a meter or more. Magnetic flowmeter 300 has a passage 302 for liquid flow. Passage 302 is surrounded by a pipe 304 that has an interior surface that is at least partially insulated near electrodes 306, 308.

Flowtube assembly 303 includes a pair of electromagnet coils 310, 312 and a magnetic shield or return path 314 that produce a magnetic field in the liquid in passage 302. Electromagnet coils 310, 312 are connected in series by lead 316 and have two input leads 318, 320 for receiving a ramped excitation current. The magnetic field is a ramped magnetic excitation.

The electrodes 306, 308 are connected by leads 322, 324 to an electronic converter or transmitter 326. The leads 322, 324 couple to a differential amplifier 328 in the transmitter 326. The differential amplifier 328 has high impedance inputs and a lower impedance output and acts as a buffer coupling to the electrode circuit and generating a buffered amplifier output. The electrodes 306, 398 and the leads 322, 324 form an electrode circuit that provides both a flow signal and ramp spikes to the transmitter 326.

The differential amplifier 328 provides an amplified electrode signal, that includes both a flow signal and ramp spikes, to processing circuitry 330 in transmitter 326, which selectively processes the amplified flow signal in a conventional manner and generates a flow rate output at 332 that can be transmitted to a remote location.

The differential amplifier 328 also provides an amplified electrode signal to processing circuitry 334 in transmitter 326 that selectively processes the amplified ramp spikes and generates a liquid conductivity indicating output at 301. The conductivity indicating output is calculated as a filtered integral of the ramp spikes and indicates liquid conduction conditions in the passage 302.

It will be understood by those skilled in the art that processing circuitry 330 and processing circuitry 334 can be combined in a single processor such as a general purpose microprocessor system or an application specific integrated circuit (ASIC) or a combination of various known circuits programmed to perform the desired functions.

The processing circuit 334 can adjust the flow rate output to an alarm level when the indication of liquid conduction indicates that liquid conduction is inadequate for accurate flow measurement. This may be caused by a change in chemical composition of the liquid, coating of the electrodes, or an empty or partially filled flow tube 304.

Figure 4:
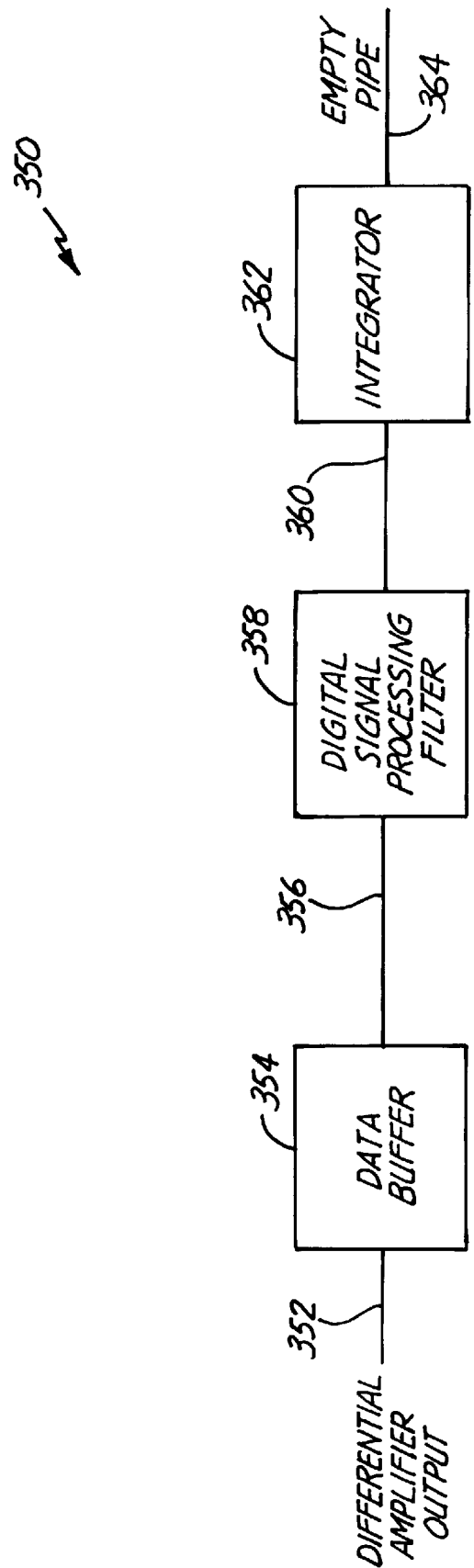
FIG. 4 illustrates an embodiment of a circuit providing an improved liquid conduction indication.

FIG. 4 illustrates an embodiment of a circuit 350 that can be used in processor 334 of FIG. 3. Circuit 350 receives an amplified electrode signal that includes ramp spikes on line 354. A data buffer 354 stores a time series of data points from line 352. The series of data points can be a single ramp spike, a pair of ramp spikes or a longer series of ramp spikes, depending on the application. When the data buffer 354 has stored a complete set of data points, the set of data points is transferred along line 356 to a digital signal processing (DSP) filter 358.

Filter 358 can be a bandpass filter that digitally calculates a bandpass filtered selection of the data points representing the ramp spikes. The filtered selection of data points is coupled along line 360 to an integrator 362. Integrator 362 integrates the filtered data points to provide an indication of liquid conduction at 364.

Integrator 362 preferably gates the calculation of the filtered integral in synchronization with the ramp spikes. This synchronization can be accomplished using a sample of the coil excitation. The integrator receives a sample of the coil excitation and then gates calculation of the filtered integral as a function of the received sample. Alternatively, the integrator 362 can gate calculation of the filtered integral in auto-synchronization with the ramp spikes themselves.

The conduction indicating output at 364 can be used directly, or the output at 364 can be compared to a stored reference level in integrator 364, and the integrator can generate an indication of liquid conduction in the passage as a function of the comparison. Preferably, the integrator 362 includes a comparator that compares running averages of the time integrals to the stored reference level.

In yet another embodiment, the integrator 362 can calculate a time integral of a difference between positive and negative ramp spikes, and the integrator 362 can compare the difference to a stored reference level and then generate the indication of liquid conduction as a function of the comparison.

In yet another embodiment, the integrator 362 can calculate running averages of filtered integrals of the ramp pulses and generates the indication of liquid conduction as a function of the running averages.

Various combinations of the alternative functions described above can be included in integrator 362 and then one of the functions can be selected for use at the time of installation, depending on the needs of the application environment.

Figure 5:
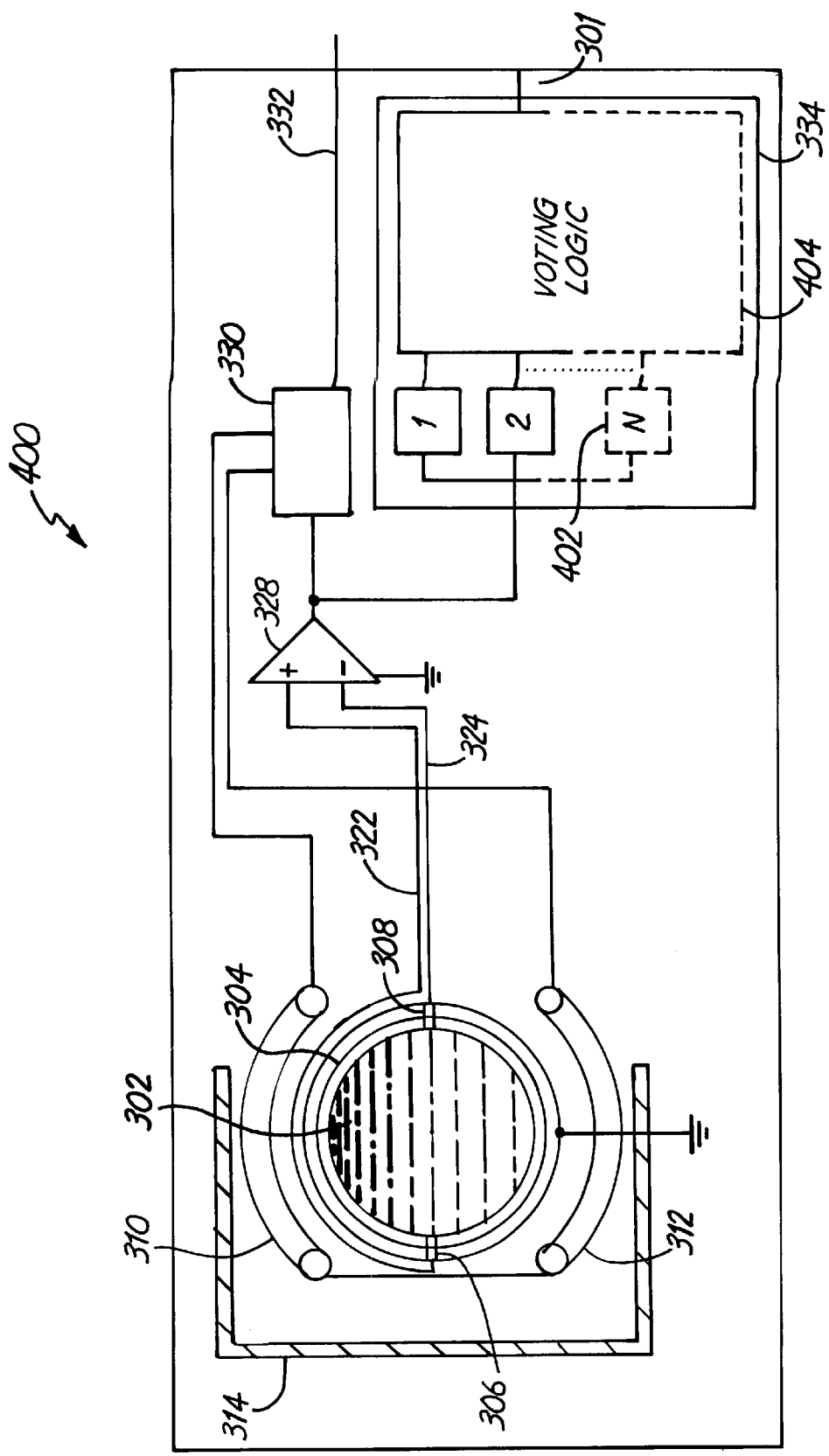
FIG. 5 illustrates an embodiment of a magnetic flowmeter using voting logic to provide an improved liquid conduction indication.

FIG. 5 illustrates a further embodiment of a magnetic flowmeter 400. The magnetic flowmeter 400 in FIG. 5 is similar to the magnetic flowmeter 300 shown in FIG. 3 and reference numerals used in FIG. 3 are also used in FIG. 5 to identify similar or identical features. In FIG. 5, a processor 334 includes a combination of 1, 2 . . . N functions 402 which each calculate a liquid conductivity indication based on ramp spikes using differing methods or algorithms for integrating and comparing the ramp spikes, as discussed above in connection with FIG. 4. A voting logic circuit 404 performs a majority voting logic function when the differing methods 1, 2 . . . N do not all reach the same result. The output 301 is a majority voted combination of the differing methods 1,2 . . . N. In FIG. 5, the processor 330 also provides the excitation current to coils 310, 312.

Figure 6:
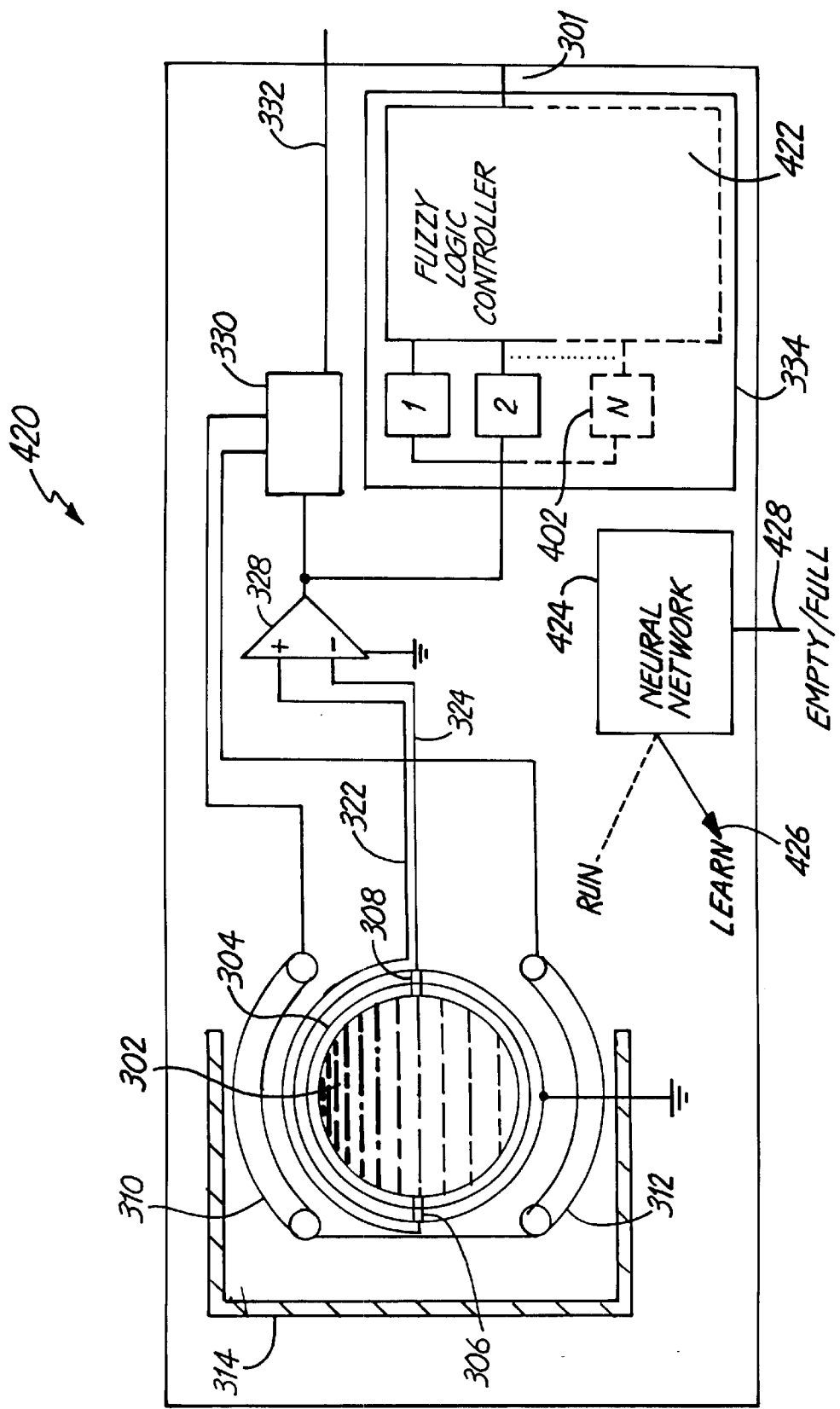
FIG. 6 illustrates an embodiment of a magnetic flowmeter using fuzzy logic and a neural network to provide an improved conduction indication.

FIG. 6 illustrates a further embodiment of a magnetic flowmeter 420. The magnetic flowmeter 420 in FIG. 6 is similar to the magnetic flowmeter 300 shown in FIG. 3 and reference numerals used in FIG. 3 are also used in FIG. 6 to identify similar or identical features. In FIG. 6, a processor 334 includes a combination of 1, 2 . . . N functions 402 which each calculate a liquid conductivity indication based on ramp spikes using differing methods or algorithms for integrating and comparing the ramp spikes, as discussed above in connection with FIG. 4. A fuzzy logic controller 422 performs a fuzzy logic function combining each of the differing methods 1, 2 . . . N according to an assigned fuzzy membership function. The output 301 is a fuzzy logic combination of the differing methods 1,2 . . . N. The fuzzy logic membership functions can be developed after the flowmeter is installed in a plant by a neural network 424. A switch 426 on the neural network is set to a "learn mode" and the flowmeter is subjected to full pipe conditions and the empty/full switch 428 is actuated to indicate "full" when the pipe is full. The flowmeter is then subjected to empty pipe conditions and the empty/full switch 428 is actuated to indicate empty when the pipe is empty. This process is repeated under varying plant environmental conditions. Then the run/learn switch 426 is placed back in the "run" position and the neural network 424 calculates the membership functions and provides the membership functions to fuzzy logic controller 422 for operational use. In FIG. 6, the processor 330 also provides the excitation current to coils 310, 312.

Figure 7:
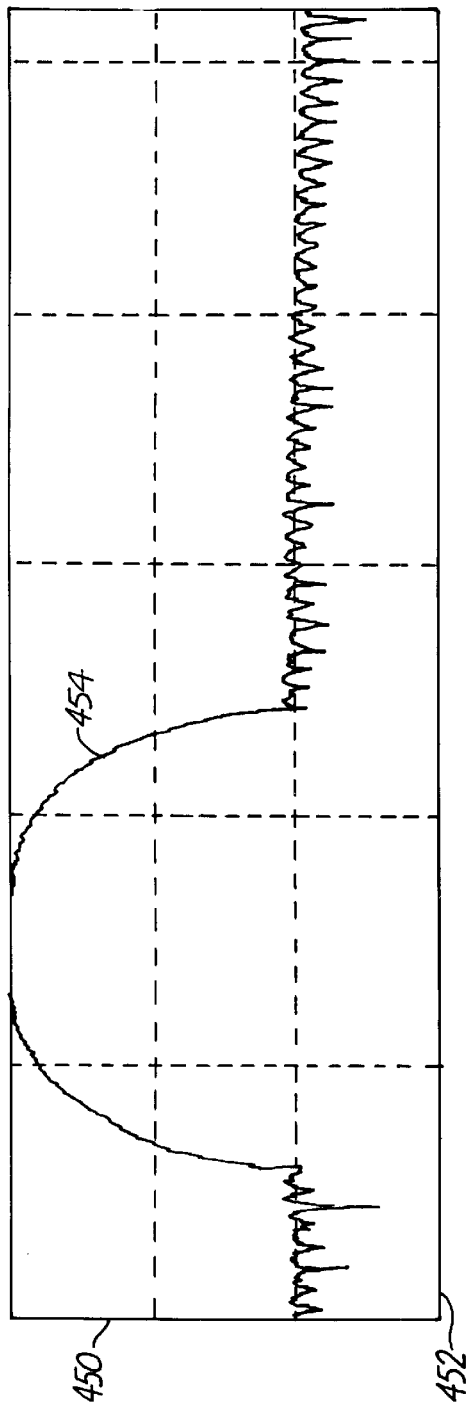
FIG. 7 illustrates an example of the amplitudes of spectral components of ramp spikes as a function of frequency.
Figure 8C:
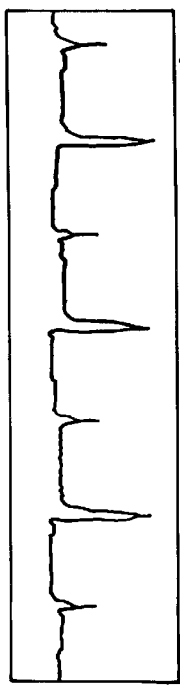
FIGS. 8A, 8B, 8C and 8D illustrate a first example, at 200 microSiemens liquid conductivity, of processed ramp spike waveforms, with full pipe waveforms on the left and empty pipe waveforms on the right; unfiltered ramp spikes on the top and bandpass filtered waveforms on the bottom.
Figure 8D:
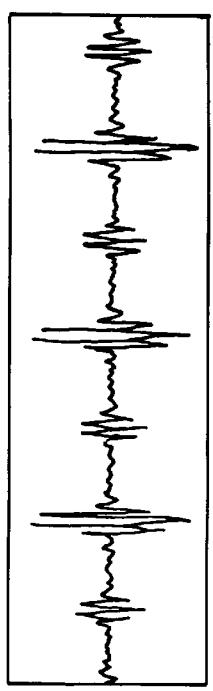
Figure 8A:
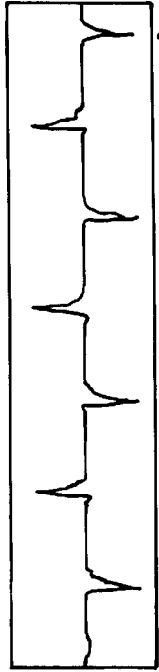
Figure 8B:
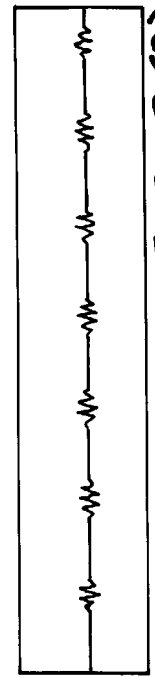

FIG. 7 illustrates an example of the amplitudes of spectral components of ramp spikes as a function of frequency. The vertical axis 450 represents amplitude of the spectral components and the horizontal axis 452 represents frequencies of the spectral components. The locus of the spectral components is shown at 454.

FIGS. 8(*a*)–8(*d*) illustrate examples of ramp spike waveforms under varying conditions using liquid with 200 microSiemens conductivity. In each waveform, the horizontal axis represents time and the vertical axis represents amplitude. At FIG. 8(*a*), a full pipe waveform of ramp pulses is shown. At FIG. 8(*b*), a filtered full pipe waveform is shown. At FIG. 8(*c*) an empty pipe ramp spike waveform is shown, and at FIG. 8(*d*) an empty pipe filtered waveform is shown. The waveform illustrates the differences between full and empty pipe conditions for one installation.

FIGS. 9(*a*)–9(*d*) illustrate a second example of processed, full pipe, ramp spike waveforms, with unfiltered ramp spikes at 9(*a*) and 9(*c*) and filtered spikes at 9(*b*) and 9(*d*), using 200 microSiemens conductivity liquid at 9(*a*) and 9(*b*), and using 20 microSiemens conductivity liquid at 9(*c*) and 9(*d*). The waveforms illustrate the differences between adequate and low conductivity conditions for one installation.

FIGS. 10(*a*) and 10(*b*) illustrate amplitudes of spectral components of electrode circuit signals for full and empty pipe conditions. The vertical axis represents amplitude of the spectral components and the horizontal axis represents frequency. FIG. 10(*a*) illustrates electrode circuit signals with full pipe and adequate liquid conductivity for measurement to provide a good signal to noise ratio between flow signal peaks and noise generated in the fluid. FIG. 10(*b*) illustrates electrode circuit signals with empty pipe conditions producing high levels of noise.

Figure 11:
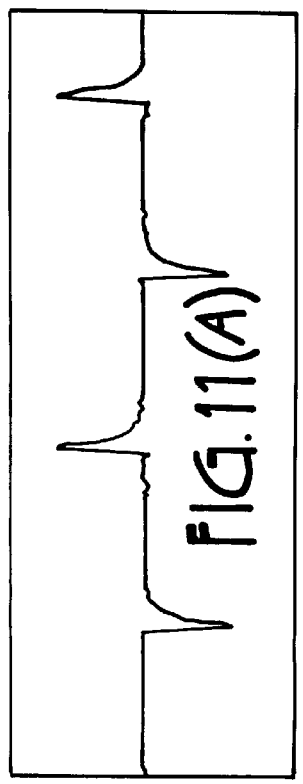
FIGS. 11A, 11B, 11C and 11D illustrate an example, at 200 microSiemens liquid conductivity, of ramp spike waveforms, with full pipe waveforms on the left and empty pipe waveforms on the right; unfiltered ramp spikes on the top and highpass filtered waveforms on the bottom.
Figure 11:
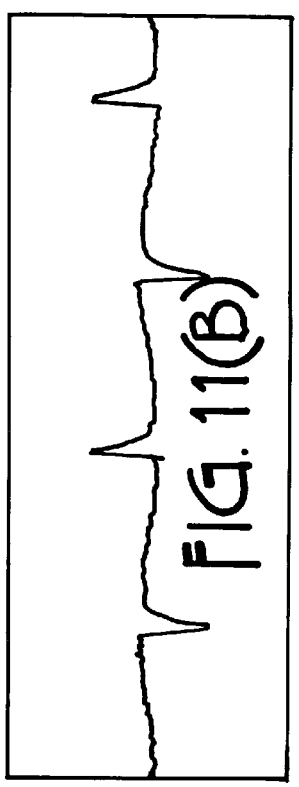
Figure 11:
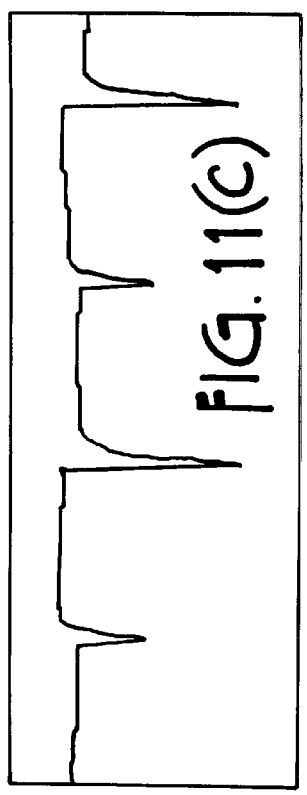
Figure 11:
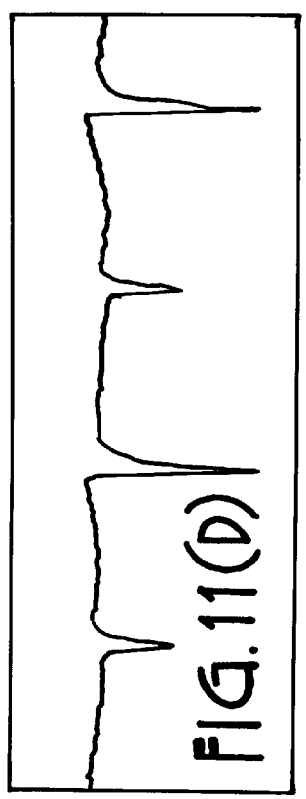

FIGS. 11(*a*)–11(*d*) illustrate an example, at 200 microSiemens liquid conductivity, of ramp spike waveforms, with full pipe waveforms 11(*a*), 11(*b*) on the left and empty pipe waveforms 11(*c*), 11(*d*) on the right; unfiltered ramp spikes 11(*a*), 11(*c*) on the top and highpass filtered waveforms 11(*b*), 11(*d*) on the bottom.

There can be a great variation in ramp spike waveforms due to small differences in alignment of the electrodes and electromagnets in individual flowtubes and installation conditions. The arrangements with majority voting logic and fuzzy logic are particularly effective in dealing with these variations.

Although the present invention has been described with reference to preferred embodiments, workers skilled in the art will recognize that changes may be made in form and detail without departing from the spirit and scope of the invention. For example, various circuit functions that have been described in block diagram form can also be performed in a series of steps performed by a digital microprocessor.

What is claimed is:

1. A magnetic flowmeter with an improved liquid conduction indication, comprising:
   a flowtube assembly having a passage for liquid flow and having an electromagnet mounted outside the passage adapted to provide ramped magnetic excitation and having an electrode circuit coupling through the passage and generating ramp spikes and a flow signal; and
   a processor receiving the flow signal and generating a flow rate output; the processor further receiving the ramp spikes and generating a filtered integral of the ramp spikes as a liquid conduction indication.

2. The magnetic flowmeter of claim 1 wherein the processor adjusts the flow rate output to an alarm level when the indication of liquid conduction indicates that liquid conduction is inadequate for flow measurement.

3. The magnetic flowmeter of claim 1 wherein the ramped magnetic excitation has ramp transitions between flat levels as a function of time, and the electrode circuit generates the ramp spikes during the ramp transitions.

4. The magnetic flowmeter of claim 1 wherein the ramped magnetic excitation alternates between two flat levels and the ramp spikes comprise alternating positive and negative ramp spikes.

5. The magnetic flowmeter of claim 1 wherein the processor calculates a bandpass filtered selection of the ramp spikes.

6. The magnetic flowmeter of claim 1 wherein the processor gates the calculation of the filtered integral in synchronization with the ramp spikes.

7. The magnetic flowmeter of claim 6 wherein the processor receives a sample of the ramped magnetic excitation and gates calculation of the filtered integral as a function of the received sample.

8. The magnetic flowmeter of claim 1 wherein the processor calculates the filtered integral as a function of a time integral of ramp spikes and compares the filtered integral to a stored reference level, the processor generating the indication of liquid conduction in the passage as a function of the comparison.

9. The magnetic flowmeter of claim 8 wherein a comparator compares running averages of a plurality of time integrals to the stored reference level.

10. The magnetic flowmeter of claim 1 wherein the processor calculates a time integral of a difference between positive and negative ramp spikes, the processor comparing the difference to a stored reference level, the processor generating the indication of liquid conduction as a function of the comparison.

11. The magnetic flowmeter of claim 10 wherein the processor calculates running averages of filtered integrals of the ramp spikes and generates the indication of liquid conduction as a function of the running averages.

12. The magnetic flowmeter of claim 1 wherein the processor comprises voting logic controlling the liquid conduction indication.

13. The magnetic flowmeter of claim 1 wherein the processor comprises fuzzy logic controlling the liquid conduction indication.

14. The magnetic flowmeter of claim 1 wherein the processor comprises a neural network.

15. A magnetic flowmeter with an improved liquid conduction indication, comprising:
   a flowtube assembly having a passage for liquid flow and having an electromagnet mounted outside the passage adapted to generate ramped magnetic excitation and having an electrode circuit coupling through the passage and generating ramp spikes and a flow signal;
   a converter having a buffer coupling to the electrode circuit and generating a buffer output, and having a flow output circuit receiving the buffer output and generating a flow rate output;
   a filter receiving the buffer output and selectively reproducing ramp spikes; and
   an integration circuit receiving the reproduced ramp spikes and generating an indication of liquid conduction in the passage.

16. The magnetic flowmeter of claim 15 wherein the ramped magnetic excitation has ramp transitions between flat levels as a function of time, and the electrode circuit generates the ramp spikes during the ramp transitions.

17. The magnetic flowmeter of claim 15 wherein the ramped magnetic excitation alternates between two flat levels and the ramp spikes comprise alternating positive and negative ramp spikes.

18. The magnetic flowmeter of claim 15 wherein the filter comprises a bandpass filter with a bandpass selected to pass ramp spikes and attenuate flow signals.

19. The magnetic flowmeter of claim 15 wherein the filter is synchronously gated in synchronization with the ramp spikes.

20. The magnetic flowmeter of claim 19 wherein the filter includes a gating input and is synchronously gated by a sample of the ramped magnetic excitation.

21. The magnetic flowmeter of claim 19 wherein the filter is synchronously self-gated as a function of the ramp spikes.

22. The magnetic flowmeter of claim 15 wherein the integration circuit includes:
   an integrator storing time integrals of the reproduced ramp a spikes;
   a stored reference level; and
   a comparator, the comparator receiving the time integrals and the stored reference level and generating the indication of liquid conduction in the passage.

23. The magnetic flowmeter of claim 22 wherein the comparator compares running averages of the time integrals to the stored reference level.

24. The magnetic flowmeter of claim 15 wherein the integration circuit includes:
   a first integrator storing first time integrals of reproduced positive ramp spikes;
   a second integrator storing second time integrals of reproduced negative ramp spikes;
   a stored reference level; and
   a comparator coupled to the first and second integrators and the stored reference level and generating an indication of liquid conduction in the passage.

25. The magnetic flowmeter of claim 24 wherein the comparator compares the difference between the first and second time integrals to the stored reference level.

26. The magnetic flowmeter of claim 24 wherein the comparator compares running averages of the first and second time integrals to the stored reference level.

27. The magnetic flowmeter of claim 15 wherein the indication of liquid conduction is coupled to the flow output circuit, the flow rate output going to an alarm level when the indication of liquid conduction indicates that liquid conduction is inadequate for measurement.

28. A magnetic flowmeter with an improved liquid conduction indication, comprising:

a flowtube assembly having a passage for liquid flow and having an electromagnet mounted outside the passage adapted to provide ramped magnetic excitation and having an electrode circuit coupling through the passage and generating ramp spikes and a flow signal;

a processor receiving the flow signal and generating a flow rate output; and means for receiving the ramp spikes and generating a filtered integral of the ramp spikes as a liquid conduction indication.

* * * * *

UNITED STATES PATENT AND TRADEMARK OFFICE
CERTIFICATE OF CORRECTION

PATENT NO. : 6,611,770 B1 Page 1 of 1
DATED : August 26, 2003
INVENTOR(S) : O'Donnell et al.

It is certified that error appears in the above-identified patent and that said Letters Patent is hereby corrected as shown below:

Column 8,
Line 43, "ramp a spikes;" change to -- ramp spikes --

Signed and Sealed this

Sixth Day of July, 2004

JON W. DUDAS
*Acting Director of the United States Patent and Trademark Office*